V. THRANE.
PROCESS OF GRANULATING CYANAMID CONTAINING FREE LIME.
APPLICATION FILED JAN. 16, 1917.
1,326,310. Patented Dec. 30, 1919.
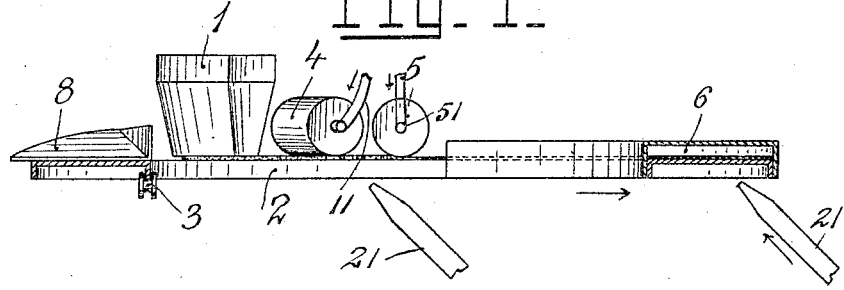
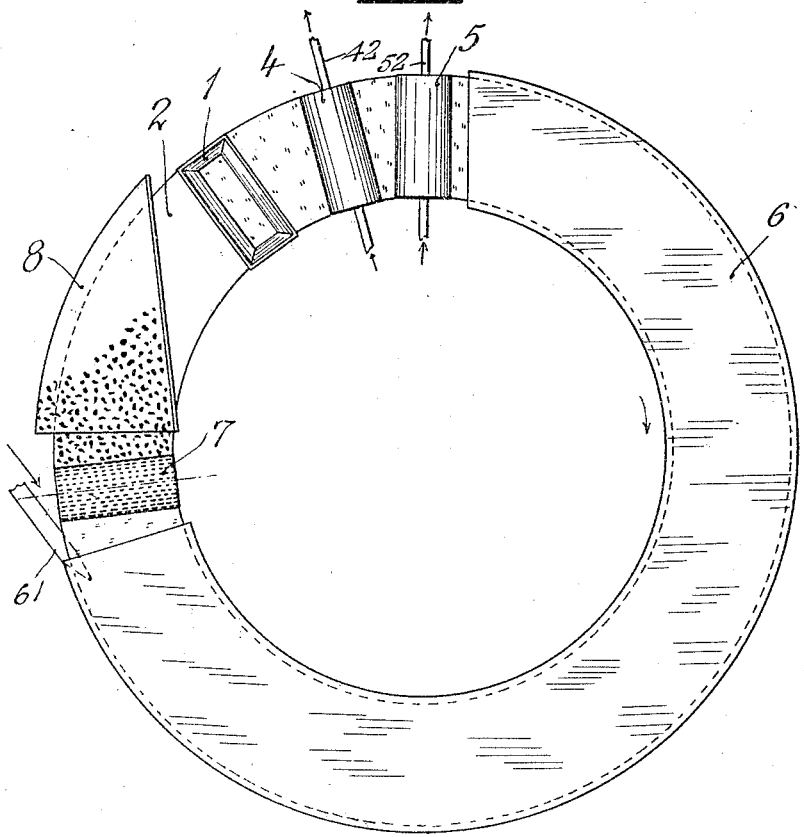
Inventor:
Victor Thrane
by Albert G. Parker
Attorney

UNITED STATES PATENT OFFICE.

VICTOR THRANE, OF CHRISTIANIA, NORWAY.

PROCESS OF GRANULATING CYANAMID CONTAINING FREE LIME.

1,326,310.  Specification of Letters Patent.  Patented Dec. 30, 1919.

Application filed January 16, 1917. Serial No. 142,641.

*To all whom it may concern:*

Be it known that I, VICTOR THRANE, subject of Norway, residing at Peder Clausens gate 3, Christiania, Norway, have invented certain new and useful Improvements in Processes of Granulating Cyanamid Containing Free Lime, of which the following is a specification.

It is a well-known fact, that by mixing calcium cyanamid (so-called "lime nitrogen") with a suitable quantity of water a pulpy mass is obtained, which hardens after some time, the water being combined with the free CaO so as to form $Ca(OH)_2$. This substance does not possess the dusty and caustic properties of the ordinary cyanamid.

Experience has shown that the most convenient form of cyanamid, if it has to be used as a fertilizer, is small balls or granules. Attempts have been made in order to produce such a product, these attempts having been based upon the pasty or pulpy consistency which a mixture of cyanamid and water possesses for some time. Thus the pasty mass has for instance been applied to a rotating member with small superficial cavities, from which the substance is removed after the hardening. In this manner a product of the desired form certainly is obtained, but the technical difficulties are evident, especially on account of the production having to be effected on a large scale. It has also been proposed to accelerate the hardening or the drying by the use of heat. But thereby a loss of nitrogen may easily arise, because in mixtures of cyanamid and water a lively formation of ammonia takes place at a comparatively low temperature (about 40 degrees C.), as is well-known.

The present invention has for its object the granulation of cyanamid by the use of rotating or otherwise movable members for conveying the pulpy or pasty mixture of cyanamid and water. The apparatus employed is distinguished substantially by the fact that the said conveying member constitutes a closed ring or an endless belt, upon which the well-known treating processes such as pressing, drying and disintegration may take place without the mass being removed from the member.

Thereby the difficulties mentioned above are avoided, and the granulation may be effected in a large scale under the most favorable conditions. It is practicable to use a minimum excess of water for slaking the lime. As the substance during the whole process rests upon the same carrying member, the mass need not possess any degree of cohesiveness. Similar to the principle of a crush-mill a pressing roll is used to accelerate the reaction between CaO and water. This is highly important, because the water by the pressure is forced into the mass and is thereby caused to react with the smallest particles of the material. Thereby the decomposition of the cyanamid and the formation of ammonia, with consequent loss of nitrogen, and the bursting of the granules or balls (on account of local super-heating), are avoided. The cohesiveness of the mass is increased by subjecting it to pressure once more after the slaking has been completed but before the mass has become quite dry. Overheating should be prevented, so as to avoid loss of nitrogen, hence the parts of the apparatus are cooled and the drying takes place by a counter-current of gas (for instance by air, $CO_2$ or the like) of a suitable temperature.

Apparatus suitable for use in the present process is illustrated in the accompanying drawing, in which Figure 1 is an elevation in section and Fig. 2 is a plan view.

The apparatus consists of a feeding device —1— and a preferably smooth, cooled annular plate or table —2— running upon rolls or wheels —3— and driven in any suitable manner, for instance by a gearing or the like. Upon the upper side of the plate a reaction-roll —4— (preferably internally cooled) is arranged, and at a suitable distance therefrom there is a pressing roll —5— (preferably cooled). Close to the latter there is a channel-space —6— for the drying gas conducted in opposite direction to that of the mass, this gas being introduced, for example, at 61. After the said space follows a pike-roll —7— for subdividing the mass, and a plow —8— for removing the product from the plate.

The cooling may be effected in any convenient manner, thus the rolls 4 and 5 may be hollow, and cold water introduced thereinto by the pipes 41 and 51 respectively, and led off by pipes 42 and 52 respectively. Below the plate 2 may be provided any suitable number of cold air blasts 21, for directing currents of cold air or cold water against the under side of the said plate. These are, it is understood, merely illustrative forms of cooling means.

The mixture is by means of the feeding device —1— supplied to the annular plate in the form of a thin layer and is carried forward on the said plate to the reaction roll —4— causing an acceleration of the reaction between $CaO$ and $H_2O$. At a suitable distance from this roll the mixture passes beneath the pressing roll —5—, by which the consistency of the layer is regulated. Then the mixture travels to the drying channel —6—, in which it—in addition to being dried, for instance by means of a counter-current of air—may be subjected to the action of a reacting gas (such as $CO_2$). Coming out from the drying-channel the layer passes the pike-roll —7—, by which the dried mixture is subdivided into granules of a suitable size, whereupon it is removed from the plate —2— by means of the plow —8—.

Instead of a closed annular plate an endless belt may be used.

Having now described my invention, what I claim as new and desire to secure by Letters Patent, is:

1. Process of granulating cyanamid comprising the steps of feeding cyanamid containing free lime together with some water onto a moving surface, pressing the mixture thereby accelerating the reaction between the lime particles and water, pressing the mass after reaction has taken place, drying the product on the moving surface and breaking it up into granules of suitable size.

2. Process of granulating cyanamid comprising the steps of feeding cyanamid containing free lime and an amount more than sufficient to slake the lime water onto a moving surface, pressing the mixture, thereby accelerating the reaction between the lime and water, again pressing the mass after reaction has taken place, drying the product on the moving surface by means of a gas flowing in counter-current contact with the cyanamid, and breaking it up into granules of suitable size.

3. Process of granulating cyanamid comprising the steps of feeding a mixture of cyanamid containing free lime and water onto a moving surface, compressing the mixture, thereby accelerating the reaction between the lime particles and water, compressing the mass after reaction has taken place, drying the product on the moving surface by means of a gas containing carbon dioxid led in counter-current contact with the cyanamid and breaking it up into granules of suitable size.

4. Process of producing granular cyanamid comprising the steps of feeding a mixture of cyanamid containing free lime and water onto a moving surface, pressing the mixture, thereby accelerating the reaction between the lime particles and water, again pressing the mass after reaction has taken place, drying the product on the moving surface and breaking it up into granules of suitable size, and keeping the temperature of the mass during the whole process so low as to avoid formation of any material quantities of ammonia.

5. Process of producing granular cyanamid comprising the steps of continuously feeding cyanamid containing free lime together with an amount of water sufficient to hydrate all the free lime in the cyanamid onto a moving surface, pressing the mixture, thereby accelerating the reaction between the $CaO$ particles and water, again pressing the mass after reaction has taken place, drying the product on the moving surface, and breaking it up into granules of suitable size, and holding the temperature of the mass during the whole process, by artificial cooling, so low as to avoid the formation of substantial quantities of ammonia.

In testimony whereof I have affixed my signature in presence of two witnesses.

VICTOR THRANE.

Witnesses:
T. S. OLSEN,
HARAR ZAHN.